Patented Jan. 19, 1954

2,666,742

UNITED STATES PATENT OFFICE 2,666,742

ACETYLENE SOLUTION

Harry M. Walker, Dickinson, Tex., assignor to Monsanto Chemical Company, St. Louis, Mo., a corporation of Delaware No Drawing. Application November 5, 1952, Serial No. 318,950

10 Claims. (Cl. 252—1)

This invention relates to acetylene and more specifically to acetylene solutions. This invention also relates to the recovery of acetylene from an acetylene containing gas by means of a selective solvent.

It is known in the art that various organic compounds have shown utility as selective solvents for acetylene, thereby affording means for storing acetylene in the form of solutions of acetylene in these solvents and means of extracting acetylene from gas mixtures or increasing the acetylene content of such gas mixtures.

It is an object of this invention to provide a class of solvents having exceptional utility in the aforementioned applications. Other objects will become apparent from the description of this invention.

It has been discovered that the trimethyl esters of ortho aliphatic acids having the formula $$R\text{---}C\equiv(OCH_3)_3$$

wherein R represents hydrogen or an alkyl radical containing from 1 to 3 carbon atoms, are excellent solvents for acetylene.

The Bunsen coefficients (volume of gas, measured at 0° C. and 760 mm. Hg, dissolved, at the temperature of the experiment, in one volume of solvent at a gas partial pressure of 760 mm. Hg) for acetylene in these solvents indicate their excellent solvent action for acetylene. The Bunsen coefficients ($\alpha_0$) were determined in the following manner:

A quantity of acetylene was introduced into a calibrated flask and its initial pressure $p_i$ (measured to ±0.05 mm. Hg), initial volume $V_i$ (measured to ±0.05 ml.), and initial temperature $T_i$ (measured to ±0.02° C.) determined. A quantity of solvent was then added to a second calibrated flask and its volume $ml_s$ and vapor pressure $P_s$ determined. The acetylene was then transferred to the flask containing the solvent and, after agitation, the temperature of the liquid brought to a temperature of 25° ±0.005° C. and the temperature of the gas brought to a temperature of 25.3°±0.05° C. The pressure $p_f$ of the gas, volume $V_f$ of the gas and temperature $T_f$ of the gas were then determined. $\alpha_0$ was then calculated as follows:

$$\alpha = \frac{273.2}{760 ml_s}\left(\frac{p_i V_i}{T_i Z_i} - \frac{(p_f - p_s)V_F}{T_f Z_f}\right)$$

where $$Z_i = \frac{80,000 - p_i}{80,000}$$

$$Z_f = \frac{80,000 - (p_f - p_s)}{ps - p_s}$$

$$p_s = x_s p_s$$

$$x_s = \frac{22,400 d_s}{22,400 d_s + \alpha_0 MW_s}$$

where $d_s$ = density of solvent at 25° C.

$MW_s$ = molecular weight of solvent $$\alpha_0 = \frac{\alpha 760 Z_f}{p_f - p_s}$$

In accordance with the procedure outlined above, the Bunsen coefficient for acetylene at 25° C. in trimethyl orthoformate was found to be 15.12 and the Bunsen coefficient for acetylene at 25° C. in trimethyl orthoacetate was found to be 13.78. Correspondingly high Bunsen coefficients for acetylene are to be found in trimethyl orthopropionate and trimethyl orthobutyrate.

According to this invention, these solvents are most efficiently used in the extraction of acetylene from diluted acetylene such as is obtained by the partial oxidation of low molecular weight hydrocarbons. As an example, dilute acetylene obtained from the partial oxidation of methane with oxygen has the following composition:

|   | Per cent |
|---|---|
| $C_2H_2$ | 8.5 |
| $H_2$ | 51.4 |
| $N$ | 1.6 |
| $CO$ | 26.3 |
| $CH_4$ | 5.8 |
| $CO_2$ | 5.9 |
| $C_2H_4$ | 0.1 |
| Heavier acetylenes | 0.4 |

This gas stream is treated under pressure with the aforementioned solvents in any convenient manner well known to those skilled in the art as, for example, by countercurrent absorption in a suitable column. The solution of acetylene is then transferred to a suitable desorption column where the pressure is released and the temperature raised. Concentrated acetylene is thus obtained and any contamination of the acetylene with the solvent is so small as to be insignificant.

In addition to the utility of these solvents in the extraction of acetylene from diluted acetylene, the Bunsen coefficients of these solvents clearly indicate that they are particularly suited for storing acetylene under elevated pressures.

The solvents described herein may be used per se, or they may be used in mixtures with other acetylene solvents.

What is claimed is:

1. A composition of matter comprising a solution of acetylene in a trimethyl ester of an ortho aliphatic acid having the formula $$R\text{---}C\equiv(OCH_3)_3$$

wherein R is selected from the group consisting of hydrogen and alkyl radicals containing from 1 to 3 carbon atoms.

2. A composition of matter comprising a solution of acetylene in trimethyl orthoformate.
3. A composition of matter comprising a solution of acetylene in trimethyl orthoacetate.
4. A composition of matter comprising a solution of acetylene in trimethyl orthopropionate.
5. A composition of matter comprising a solution of acetylene in trimethyl orthobutyrate.
6. In a process for the recovery of acetylene from an acetylene containing gas, the step of treating said gas with a trimethyl ester of an ortho aliphatic acid having the formula $$R\text{---}C\equiv(OCH_3)_3$$

wherein R is selected from the group consisting of hydrogen and alkyl radicals containing from 1 to 3 carbon atoms.

7. In a process for the recovery of acetylene from an acetylene containing gas, the step of treating said gas with trimethyl orthoformate.
8. In a process for the recovery of acetylene from an acetylene containing gas, the step of treating said gas with trimethyl orthoacetate.
9. In a process for the recovery of acetylene from an acetylene containing gas, the step of treating said gas with trimethyl orthopropionate.
10. In a process for the recovery of acetylene from an acetylene containing gas, the step of treating said gas with trimethyl orthobutyrate.

HARRY M. WALKER.

References Cited in the file of this patent

UNITED STATES PATENTS

| Number | Name | Date |
|---|---|---|
| 1,996,088 | Taylor | Apr. 2, 1935 |
| 2,580,622 | Vogt et al. | Jan. 1, 1952 |
| 2,623,611 | Levine et al. | Dec. 30, 1952 |
| 2,642,956 | Bour | June 23, 1953 |